United States Patent Office 3,775,423
Patented Nov. 27, 1973

3,775,423
PHTHALOCYANINE-TYPE DYESTUFFS
Bernard Lamure, Lyons, France, assignor to Societe
Rhodiaceta, Paris, France
No Drawing. Continuation of abandoned application Ser.
No. 811,585, Mar. 28, 1969. This application Sept. 17,
1971, Ser. No. 181,601
Claims priority, application France, Mar. 29, 1968,
146,472
Int. Cl. C07d 29/38
U.S. Cl. 260—295 A                     8 Claims

ABSTRACT OF THE DISCLOSURE

The invention provides new phthalocyanine-dyestuffs derived at least in part from naphthylene or perylene dicarboxylic acid and containing ester groups, which can be used in colouring polyesters and polyamides.

---

This is a continuation of application Ser. No. 811,585, filed Mar. 28, 1969, now abandoned.

This invention relates to phthalocyanine dyestuffs.

According to this invention, there are provided dyestuffs of the general formula:

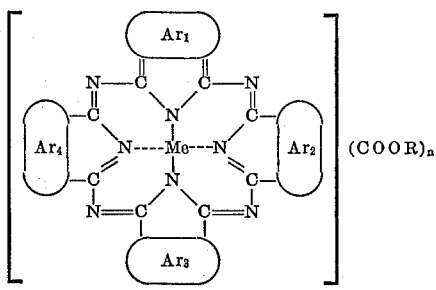

wherein Me is either a chelated metal atom or represents two hydrogen atoms; $Ar_1$, $Ar_2$, $Ar_3$ and $Ar_4$ are substituted or unsubstituted aromatic residues which may be the same or different, at least one being a 1,8-naphthylene or a 3,4-perylene radical, and COOR is a carboxylic group substituting one or more of the aromatic residues, R being hydrogen atom or an aliphatic, cycloaliphatic, aryl or araliphatic radical and $n$ being from 1 to 8 inclusive. The chelated metal atom, Me, may be a monovalent or polyvalent metal such as sodium, potassium, lithium, calcium, zinc, tin, particularly copper, cobalt, iron, lead and especially nickel.

The aromatic residues of the dyestuffs may, in addition to the carboxylic acid or ester groups, be substituted by other groups, such as alkyl, alkoxy, tertiary amine, nitro or halogen groups.

The dyestuffs of the present invention may be obtained by methods known for the preparation of phthalocyanines in general, by replacing the ortho-phthalic acid (or a derivative thereof) used in the preparation of simple phthalocyanines, either totally or in part, by a naphthalene-1,8-dicarboxylic acid and/or a perylene-3,4-dicarboxylic acid (or derivatives thereof), and, optionally, in part by a trimellitic acid and/or a pyromellitic acid (or a derivative thereof). (By "derivative thereof," is meant herein not only the free carboxylic acids specified but also their anhydrides, ortho-diamides, ortho-dinitriles and ortho-cyanoamides.) Each acid, or derivative thereof, may also be substituted in the aromatic nucleus by one or more examples of one or more of the groups carboxyl, carboxylic ester, alkyl, alkoxy, tertiary amine, nitro and halogen.

Thus, the dyestuffs of the present invention may be prepared by a process which comprises heating a mixture of a naphthalene-1,8-dicarboxylic acid and/or a perylene-3,4-dicarboxylic acid (or derivatives thereof) with an ortho-phthalic acid (or a derivative thereof) and/or a trimellitic and/or a pyromellitic acid (or derivatives thereof), in the presence of, when the said derivatives are other than amides or nitriles, a source of nitrogen, and, where Me is a metal, a source of the metal Me and optionally a catalyst, and converting the acid produced into an ester.

Numerous modifications of this general process exist. For example, a mixture of the ortho-dinitrile of a trimellitic or a pyromellitic acid with the 1,8-dinitrile of a naphthalene-1,8-dicarboxylic acid and/or the 3,4-dinitrile of a perylene-3,4-dicarboxylic acid, optionally mixed with an ortho-phthalic nitrile may be heated in the presence of trichlorobenzene as diluent, with a metal or a metal salt and quinoline.

A mixture of the anhydride or the ortho-diamide of a trimellitic or a pyromellitic acid with a naphthalene-1,8-dicarboxylic acid, its 1,8-anhydride or its 1,8-diamide and/or with a perylene-3,4-dicarboxylic acid, its 3,4-anhydride or its 3,4-diamide, optionally mixed with an ortho-phthalic acid, its anhydride or its amide may be heated with urea and a metallic salt in the presence of catalysts such as ammonium molybdate or boric acid in an inert diluent such as trichlorobenzene, nitrobenzene, chloronaphthalene or kerosene.

A mixture of the ortho-cyanoamide of a trimellitic or a pyromellitic acid with a 1,8-cyanoamide of a naphthalene-1,8-dicarboxylic acid and/or a 3,4-cyanoamide of a perylene-3,4-dicarboxylic acid, optionally mixed with an ortho-cyanobenzamide may be heated together, for example at about 250° C. for 4 to 6 hours.

A non-metallised dyestuff of the present invention may be obtained by heating a mixture of the ortho-dinitrile of trimellitic or a pyromellitic acid with a 1,8-dinitrile of a naphthalene-1,8-dicarboxylic acid and/or a 3,4-dinitrile of a perylene-3,4-dicarboxylic acid, optionally mixed with an ortho-phthalic nitrile with amines or phenols in an inert solvent.

It is also possible to demetallise a metallised dyestuff of the present invention in which the nucleus contains sodium, this dyestuff being obtained by reaction of a mixture of the ortho-dinitrile of trimellitic or pyromellitic acid with a peri-dinitrile of the secondary aromatic polyacid, optionally mixed with ortho-phthalic nitrile, with a sodium derivative of a lower alcohol.

Furthermore, it is possible to prepare a different metallised dyestuff by replacing the metal of the first metallised dyestuff by a different metal which forms a more stable complex. It is also possible to introduce a metal into a non-metallised dyestuff.

The acids obtained as above may thereafter be esterified in a known manner with alcohols or phenols, for example at about 235° C. under pressure. A dyestuff of the present invention carrying ester groups may also be converted to a dyestuff with different ester groups by transesterification in known manner with a different alcohol or phenol.

The dyestuffs according to the invention possess various colours ranging particularly from green to bluish-violet, which possess excellent fastness to light. They are insoluble in the usual organic solvents and melt at temperatures of 360° C. or above.

These dyestuffs may be used as pigments for colouring polymer compositions. Preferably, however, they are condensed with one or more different monomers to give coloured copolyesters and copolyamides. The coloured copolyesters may be obtained by condensing in known manner at least one aliphatic or cycloaliphatic diol containing 2 to 10 carbon atoms with at least one aliphatic or, preferably, aromatic diacid, in particular terephthalic acid, and at least one coloured monomer forming the subject of the present invention, this monomer being present in a minor amount, for example, less than 2% by weight of the polymer produced. The coloured copolyamides may be obtained by reacting a like minor amount of a coloured monomer according, to the invention with a monomer which may be either a reaction product of an aliphatic or aromatic diacid with a diamine preferably an aliphatic diamine or a lactam, or an amino-acid. The polymers thus obtained, either by themselves or mixed with similar but non-coloured polymers, may be shaped, for example into filaments or films. All these articles possess tints of a remarkable fastness, particularly to light, and are characterized by a high transparency, particularly valued in the manufacture of films.

The following examples, in which all percentages are expressed by weight, illustrate the invention:

EXAMPLE 1

The following are introduced into a glass reactor of 2 litres capacity provided with a stirrer:

19.8 g. (0.1 mol) of naphthalene-1,8-dicarboxylic acid anhydride,
19.8 g. (0.1 mol) of trimellitic anhydride,
120 g. (2 mols) of urea,
10 g. of anhydrous nickel chloride $NiCl_2$,
4 g. of ammonium molybdate
220 g. of nitrobenzene The mixture is heated for 4 hours at 135° C. with vigorous stirring. The resulting product is treated with two litres of a 5% strength aqueous solution of hydrochloric acid and the nitrobenzene is then removed by steam stripping. The mixture is filtered and the residue is then washed with water until the hydrochloric acid has been completely removed. The product is then treated with one litre of a 2% boiling aqueous solution of sodium hydroxide. The greenish-blue solution obtained is filtered and then acidified with hydrochloric acid. A precipitate is obtained which is washed with water until neutral and then dried at 100° C. for 24 hours.

21.1 g. (representing a yield of 55.5%) of a green powder are obtained, which is a product corresponding essentially to that of the attached Formula 1, in which R represents an hydrogen atom.

20 g. of this product and 240 ml. of butanol are introduced into an autoclave provided with a stirrer. The autoclave is purged with nitrogen and then raised to a temperature of 230° C. whilst stirring, this temperature being maintained for seven hours, the autogenic pressure being about 70 bars. After cooling, the diester is removed from the autoclave and the autoclave is rinsed with 200 ml. of butanol; the residue is then washed with 200 ml. of the same solvent. After drying at 100° C. for 24 hours, 16 g. (representing a yield of 69.7%) of a green powder are obtained, this being a product which essentially corresponds to that of the attached Formula 1 in which R represents a butyl radical, and the infra-red spectrum of which indicates the presence of a band at 5.90 microns attributable to the carbonyl groups.

EXAMPLE 2

The procedure of the first experiment of Example 1 is followed, using 26.8 g. (0.1 mol) of the dianhydride of naphthalene-1,4,5,8-tetracarboxylic acid and 14.8 g. (0.1 mol) of phthalic anhydride. The reaction mixture is heated to 210° C. for 4 hours. 22.2 g. (a yield of 52.4%) of a greenish-grey powder are obtained which is insoluble in an alkaline medium and is a product which essentially corresponds to that of the attached Formula 2 in which R represents a hydrogen atom.

20 g. of this product are thereafter completely esterified in 250 ml. of n-butanol in the same manner as in Example 1. 19.3 g. (representing a yield of 76.3%) of a greenish-grey powder are obtained, this being a product which essentially corresponds to that of the attached Formula 2, in which R represents the butyl radical.

EXAMPLE 3

The procedure of the first experiment of Example 1 is followed, starting from the following reaction mixture:

59.2 g. (0.4 mol) of phthalic anhydride,
38.4 g. (0.2 mol) of trimellitic anhydride,
78.4 g. (0.2 mol) of the dianhydride of perylene-3,4,9,10-tetracarboxylic acid,
480 g. of urea,
40 g. of anhydrous nickel chloride $NiCl_2$,
16 g. of ammonium molybdate,
880 g. of nitrobenzene, this mixture being heated to 210° C. for 4 hours.

127.5 g. (a yield of 72.6%) of a blackish-blue powder are obtained which is insoluble in an alkaline medium and is a product which essentially corresponds to that of the attached Formula 3 in which R represents a hydrogen atom.

30 g. of this product are thereafter completely esterified in 300 ml. of n-butanol, in the same manner as in Example 1. 30 g. (representing a yield of 84.0%) of a blue powder are obtained which is a product corresponding essentially to that of the attached Formula 3 in which R represents a butyl radical.

EXAMPLE 4

The procedure of the first experiment of Example 1 is followed, using 39.2 g. (0.1 mol) of the dianhydrides of perylene-3,4,9,10-tetracarboxylic acid and 14.8 g. (0.1 mol) phthalic anhydride. The reaction mixture is heated to 210° C. for 4 hours. 47.2 g. (representing a yield of 86.3%) of a violet powder are obtained, which is insoluble in an alkaline medium and is a product corresponding essentially to that of the attached Formula 4 in which R represents a hydrogen atom.

25 g. of this product are thereafter completely esterified in 300 ml. of n-butanol in the same manner as in Example 1. 23.5 g. (representing a yield of 78.0%) of a violet powder are obtained, which is a product corresponding essentially to that of the attached Formula 4 in which R represents a butyl radical.

EXAMPLE 5

The procedure of the first experiment of Example 3 is followed, using 156.8 g. (0.4 mol) of the dianhydride of perylene-3,4,9,10-tetracarboxylic acid, 29.6 g. (0.2 mol) of phthalic anhydride and 38.2 g. (0.2 mol) of trimellitic anhydride.

173 g. (representing a yield of 75.8%) of a brownish-violet powder are obtained which is insoluble in an alkaline medium and is a product corresponding essentially to that of the attached Formula 5 in which R represents a hydrogen atom.

30 g. of this product are thereafter completely esterified in 300 ml. of n-butanol in the same manner as in Example 1. 30.8 g. (representing a yield of 82.5%) of a blue powder are obtained which is a product corresponding essentially to that of the attached Formula 5 in which R represents the butyl radical.

EXAMPLE 6

The procedure of the first experiment of Example 1 is followed, using 78.5 g. (0.2 mol) of the dianhydride of perylene-3,4,9,10-tetracarboxylic acid. The reaction mixture is heated to 210° C. for 4 hours. 67.9 g. (representing a yield of 83.8%) of a brownish-violet powder are obtained which is insoluble in an alkaline medium and is a product corresponding essentially to that of the attached Formula 6 in which R represents a hydrogen atom.

30 g. of this product are thereafter completely esterified in 300 ml. of n-butanol in the same manner as in Example 1. 30.2 g. (representing a yield of 78.8%) of a brownish-violet powder are obtained, which is a product corresponding essentially to that of the attached Formula 6 in which R represents a butyl radical.

EXAMPLE 7

The following are introduced into a glass reactor of one litre capacity provided with a stirring device suitable for high vacuum work, a distillation column, a nitrogen inlet tube and possessing an outlet orifice at the bottom:

250 g. of dimethyl terephthalate,
177.5 g. of ethylene glycol,
0.125 g. of manganese acetate $Mn(CH_3COO)_2$,
0.101 g. of antimony oxide $Sb_2O_3$, 1.25 g. of a dyestuff with ester groups, such as described in Examples 1 to 6.

The reactor is heated by means of an oil bath. Transesterification is effected under normal nitrogen pressure for 3 hours at between 160° and 220° C.; when the theoretical amount of methanol has distilled, the temperature is progressively raised to 275° C. and the pressure is then gradually reduced to a final pressure of 0.2 to 0.3 mm. Hg; the temperature is then raised to 280° C. and the reaction mixture kept under these conditions for 50 minutes.

The resulting copolymer is in the form of a mass which is homogeneously coloured and free of inclusions which can be extruded very satisfactorily in the molten state in the form of filaments or transparent films.

The characteristics of the copolymers are indicated for each dyestuff in the table below, in which "S.V." signifies "specific viscosity of the polymer as a 1% strength solution in ortho-chlorophenol at 25° C.":

| Dyestuff | | Polymer | |
|---|---|---|---|
| Ex. No. | Colour | S.V. | Colour |
| 1 | Green | 0.84 | Green. |
| 2 | Grey-green | 0.80 | Do. |
| 3 | Blue | 0.51 | Blue. |
| 4 | Violet | 0.87 | Violet. |
| 5 | Blue | 0.84 | Blue. |
| 6 | Brownish-violet | 0.77 | Pink (with brown fluorescence). |

Each of the polymers obtained above is spun in the molten state at 285° C. and the resulting yarn is stretched on a mandrel at 85° C. and on a plate at 160° C.; a yarn of 65 denier (72.2 dtex.) gauge/33 strands is obtained.

The yarns, which have the same colours as indicated for the corresponding polymers in the table above have a strength of 4.22 g./den. (38 g./tex.) for an elongation at break of 20.3%.

The fastness properties of the colour of the yarns are evaluated with the aid of a scale of indices ranging from 1 (very poor fastness) to 8 (exceptional fastness) in accordance with the ECE Code of fastness, 2d edition (1958). The tests of the fastness of the colour to heat treatment are effected in accordance with the recommendations of the ECE Code of fastness, 1st supplement 1963, using an apparatus commercially available under the registered trade name "Thermotest." The ECE Code of fastness [2d edition (1958) and supplements] is edited by the Association for the Study and Publication of Methods for the Determination of Fastness, 12 Rue d'Anjou, Paris (8e). The fastness properties of the colour of the above yarns are excellent, as is shown by the following table:

| Treatment | Fastness of the colour | Discharge onto comparison sample |
|---|---|---|
| None | 7 | |
| Desizing at the boil | 4–5 | 5 |
| Bleaching with sodium chlorite at 80° C | 5 | 5 |
| Cleaning with perchlorethylene at 60° C | 5 | 5 |
| "Thermotest" experiments at— | | |
| 150° C | 5 | 5 |
| 180° C | 5 | 5 |
| 210° C | 5 | 5 |

The shrinkages of a woven fabric, measured in boiling water, in steam at 130° C. and in hot air at 180 and 210° C. are of the same order as the shrinkages observed on a reference sample of woven fabric of the same construction.

EXAMPLE 8

The following are introduced under a normal pressure of nitrogen into a cylindrical reactor of one litre capacity provided with a stirring device, a distillation column and a nitrogen inlet tube and possessing an outlet orifice at the bottom:

339.5 g. of a 50% strength aqueous solution of hexamethylene diamine adipate,
10 g. of a 67.8% strength aqueous solution of hexamethylene diamine,
1.7 g. of the dyestuff described in Example 4.

The reaction mixture is heated to between 190 and 220° C. for one hour in order to remove the water of reaction. The polycondensation is then carried out by heating the molten mass to 275° C. for one hour. The resulting copolyamide, which is violet in colour, has a relative viscosity of 39 measured in a solution of 1% strength by weight of the polymer in formic acid at 25° C. By spinning this copolyamide in the molten state, and stretching, yarns of a violet colour and of 40 den. (44.4 dtex.) gauge/13 strands are obtained, having a strength of 4.2 g./den. (37.8 g./tex.) for an elongation at break of 28%.

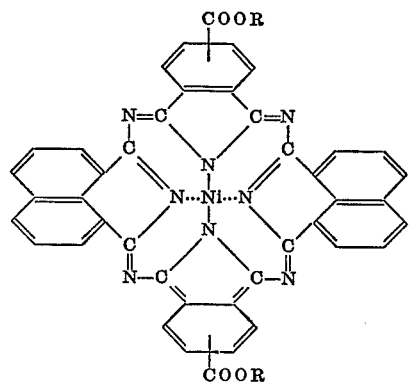

Formula 1

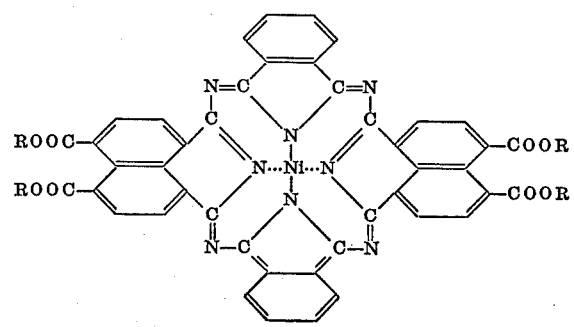

Formula 2

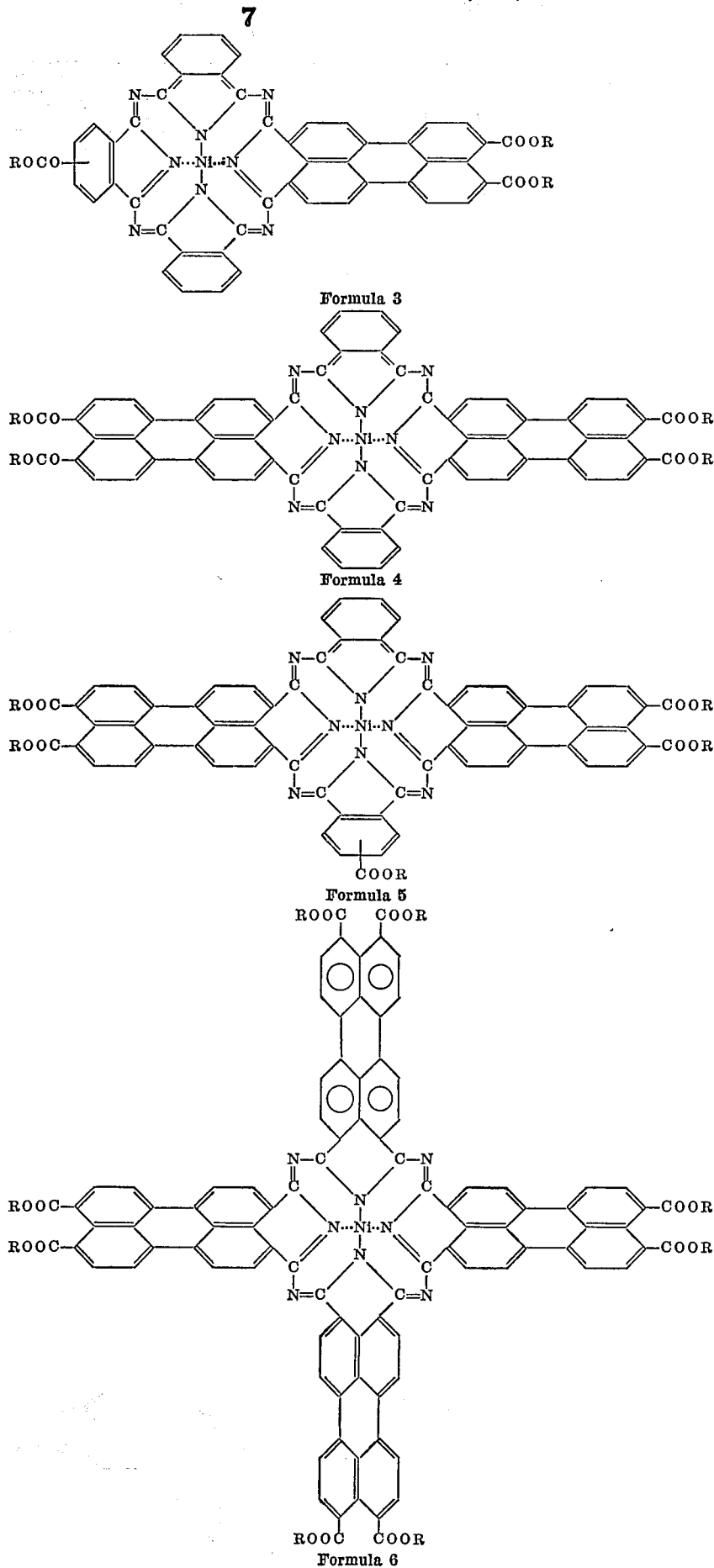
Formula 3
Formula 4
Formula 5
Formula 6

I claim:
1. A dyestuff of the formula:

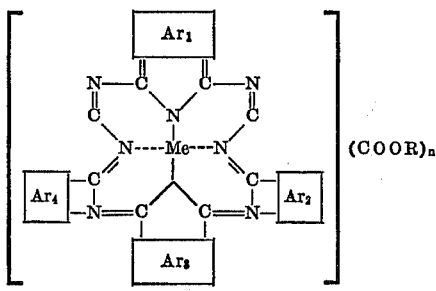

(COOR)$_n$ in which Me represents either an atom of one of the metals, calcium zinc, tin, copper, cobalt, iron, lead and nickel, or two hydrogen atoms, $Ar_1$, $Ar_2$, $Ar_3$ and $Ar_4$ are individually selected from the group which consists of 1,2-benzene, 1,8-naphthalene and 3,4-perylene radicals at least one being a 1,8-naphthalene or 3,4-perylene radical, R is a hydrogen atom or $C_1$ to $C_4$ alkyl, $n$ is an integer from 1 to 8, and the —COOR group or groups are substituents or one or more of the Ar groups in the 4- and 5-positions when Ar is benzene or naphthalene, and in the 9- and 10-positions when Ar is perylene.

2. A dyestuff according to claim 1 in which Me is nickel.

3. A dyestuffs according to claim 1 being the dyestuff of formula:

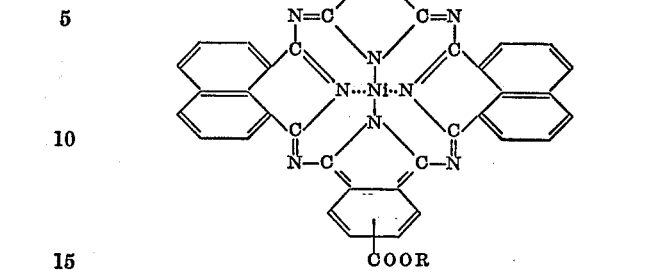

in which R is butyl.

4. A dyestuff according to claim 1 being the formula:

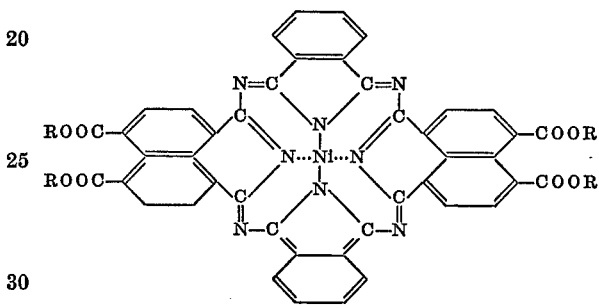

in which R is butyl.

5. A dyestuff according to claim 1 being the dyestuff of formula:

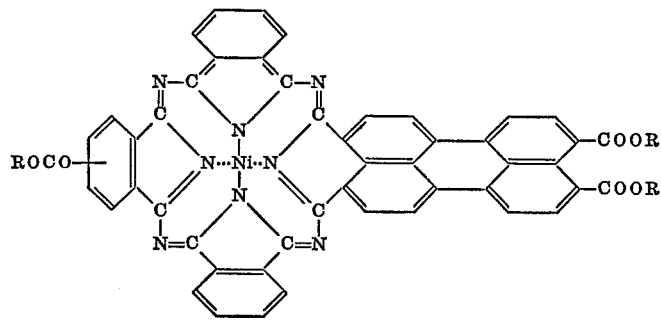

in which R is butyl.

6. A dyestuff according to claim 1 being the formula:

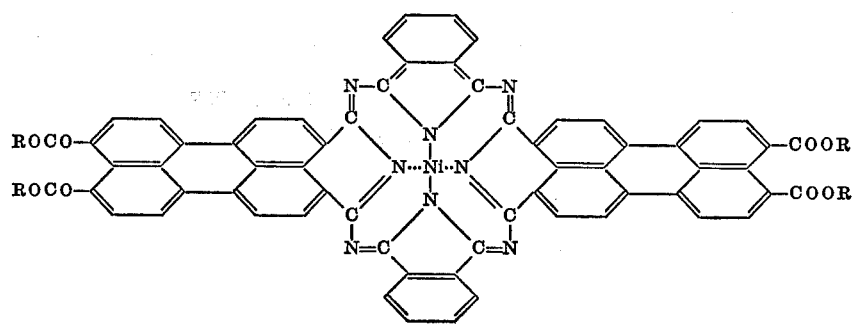

in which R is butyl.

7. A deystuff according to claim 1 being the dyestuff of formula:
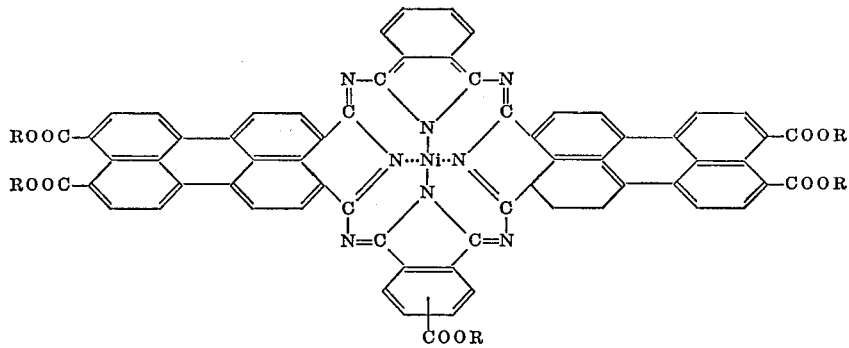
in which R is butyl.
8. A dyestuff according to claim 1 being the formula:
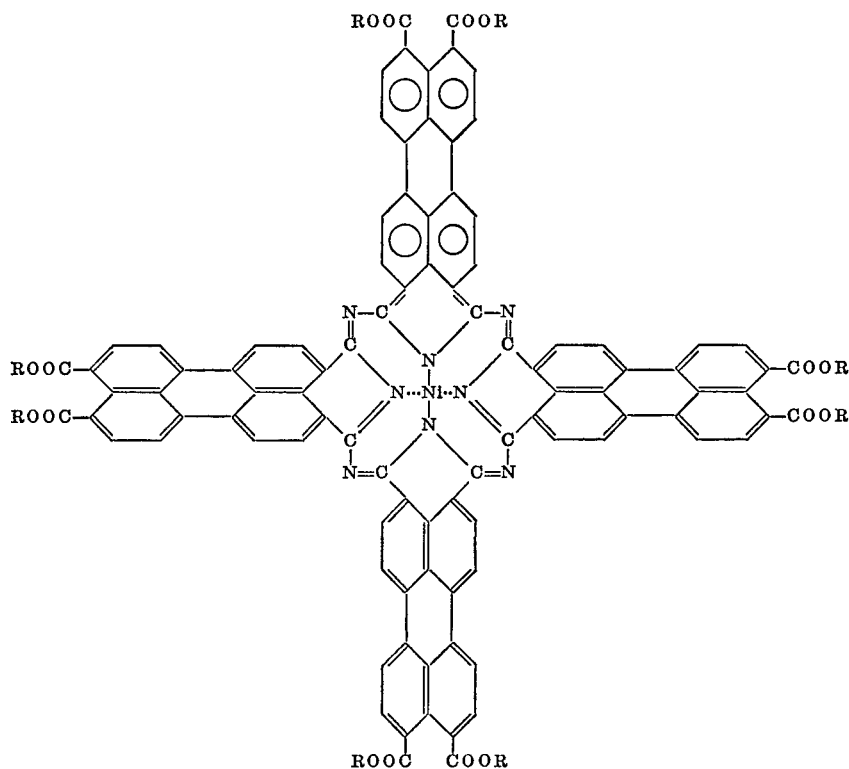
in which R is butyl.
References Cited
Moser et al., Phthalocyanine Compounds, pp. 331–336 (1963).
HARRY I. MOATZ, Primary Examiner
U.S. Cl. X.R.
8—1 R; 260—314, 314.5